(12) United States Patent
Nishimura

(10) Patent No.: US 12,294,101 B2
(45) Date of Patent: May 6, 2025

(54) ENERGY STORAGE APPARATUS

(71) Applicant: GS Yuasa International Ltd., Kyoto (JP)

(72) Inventor: Yosuke Nishimura, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 137 days.

(21) Appl. No.: 17/766,477

(22) PCT Filed: Oct. 7, 2020

(86) PCT No.: PCT/JP2020/037940
§ 371 (c)(1),
(2) Date: Apr. 4, 2022

(87) PCT Pub. No.: WO2021/070843
PCT Pub. Date: Apr. 15, 2021

(65) Prior Publication Data
US 2024/0072360 A1  Feb. 29, 2024

(30) Foreign Application Priority Data
Oct. 10, 2019  (JP) .................................. 2019-186884

(51) Int. Cl.
*H01M 50/262* (2021.01)
*H01M 50/209* (2021.01)
*H01M 50/296* (2021.01)

(52) U.S. Cl.
CPC ....... *H01M 50/262* (2021.01); *H01M 50/209* (2021.01); *H01M 50/296* (2021.01)

(58) Field of Classification Search
CPC . H01M 50/262; H01M 50/296; H01M 50/209
See application file for complete search history.

(56) References Cited

U.S. PATENT DOCUMENTS

2017/0033336 A1   2/2017  Hoshino et al.

FOREIGN PATENT DOCUMENTS

| CN | 203859171 U | 10/2014 |
|---|---|---|
| JP | H07-204743 A | 8/1995 |
| JP | 2002-347649 A | 12/2002 |
| JP | 2011-23302 A | 2/2011 |
| JP | 2012-59451 A | 3/2012 |

(Continued)

OTHER PUBLICATIONS

International Search Report (Isr) (PCT Form PCT/ISA/210), in PCT/JP2020/037940, dated Dec. 22, 2020.

*Primary Examiner* — Jane J Rhee
(74) *Attorney, Agent, or Firm* — MCGINN I.P. LAW GROUP, PLLC

(57) ABSTRACT

In the present embodiment, the energy storage apparatus includes: an energy storage device; a terminal member adjacent to the energy storage device; and a restraint member fixed to the terminal member. The restraint member includes a first portion that extends along the energy storage device in an arrangement direction in which the energy storage device and the terminal member are arranged, a second portion that extends along the terminal member in a direction intersecting the arrangement direction and is fixed to the terminal member, and a connection that connects ends of the first portion and the second portion to each other. The connection includes a plurality of bent portions or curved portions.

20 Claims, 8 Drawing Sheets

(56) References Cited

FOREIGN PATENT DOCUMENTS

| | | |
|---|---|---|
| JP | 2016-31806 A | 3/2016 |
| JP | 2016-031898 A | 3/2016 |
| WO | WO 2019/065197 A1 | 4/2019 |
| WO | WO 2019/130936 A1 | 7/2019 |
| WO | WO 2019/245023 A1 | 12/2019 |

# ENERGY STORAGE APPARATUS

CROSS-REFERENCE TO RELATED APPLICATIONS

The present application claims priority to Japanese Patent Application No. 2019-186884, the contents of Japanese Patent Application No. 2019-186884 are incorporated herein by reference.

TECHNICAL FIELD

The present invention relates to an energy storage apparatus including a restraint member that restrains an energy storage device.

BACKGROUND ART

There is known a battery pack including a restraint member that restrains a plurality of battery cells (cf. Patent Document 1). Specifically, the battery pack includes a plurality of battery cells arranged in an arrangement direction, a pair of end-plates arranged at both ends in the arrangement direction of the plurality of battery cells, and a restraint member extending in the arrangement direction of the battery cells. In this battery pack, both ends of the restraint member, which are in a bent state, are fixed to each of the pair of end-plates to restrain the plurality of battery cells.

In the battery pack described above, when the expansion or the like of the battery cell occurs by use of the battery pack, stress concentration occurs at the bent portion of the end of the restraint member, whereby plastic strain easily occurs in the restraint member.

PRIOR ART DOCUMENT

Patent Document

Patent Document 1: JP-A-2012-59451

SUMMARY OF THE INVENTION

Problems to be Solved by the Invention

Therefore, the present embodiment provides an energy storage apparatus capable of preventing the plastic strain of the restraint member.

Means for Solving the Problems

An energy storage apparatus of the present embodiment includes:
an energy storage device;
a terminal member adjacent to the energy storage device; and
a restraint member fixed to the terminal member.
The restraint member includes
a first portion that extends along the energy storage device in an arrangement direction in which the energy storage device and the terminal member are arranged,
a second portion that extends along the terminal member in the direction intersecting an arrangement direction and is fixed to the terminal member, and
a connection that connects ends of the first portion and the second portion to each other.

The connection includes a plurality of bent portions or curved portions.

The connection may include two bent portions or curved portions that are convex in a direction away from an area where the energy storage device is disposed, and a bent portion or curved portion that is disposed between the two bent portions or curved portions and is convex in a direction approaching the area.

In this case,
the bent portion or the curved portion that is convex in an approaching direction may be disposed at a position closer to the first portion than the second portion in the connection.

In the energy storage apparatus,
the connection may include a plurality of portions having different curvatures at different positions between the first portion to the second portion.

In the energy storage apparatus,
the restraint member may include a third portion that is connected to the first portion, the second portion, and the connection and is disposed along the energy storage device.

In the energy storage apparatus,
the first portion may be a plate-shaped portion spreading along the energy storage device, and
the second portion is a plate-shaped portion spreading along the terminal member.

In the energy storage apparatus,
the first portion, the connection, and the second portion may be formed integrally with each other and have a plate shape.

MODE FOR CARRYING OUT THE INVENTION

Figure 1:
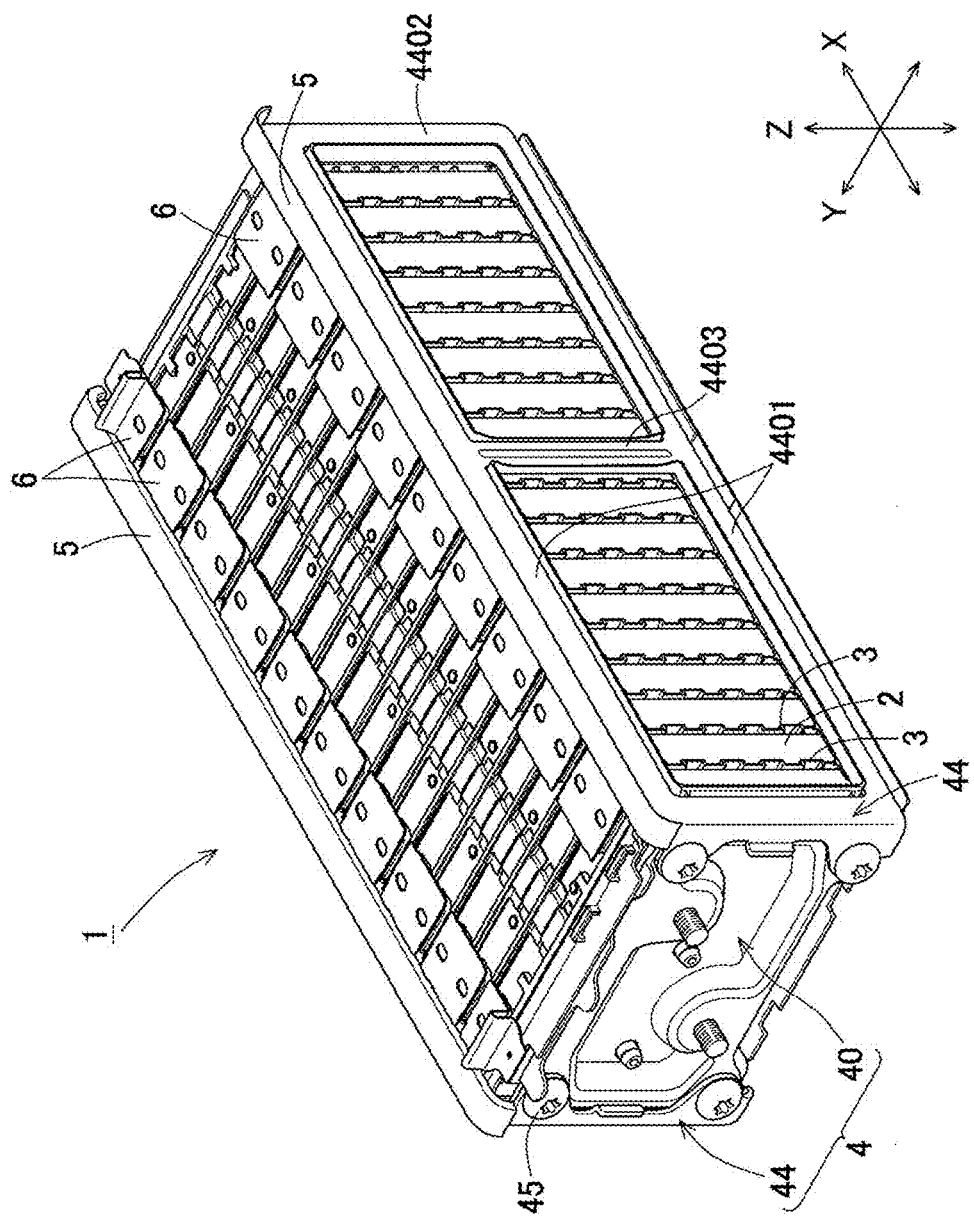
FIG. 1 is a perspective view of an energy storage apparatus according to the present embodiment.

An energy storage apparatus of the present embodiment includes:
an energy storage device;
a terminal member adjacent to the energy storage device; and
a restraint member fixed to the terminal member.
The restraint member includes
a first portion that extends along the energy storage device in an arrangement direction in which the energy storage device and the terminal member are arranged, a second portion that extends along the terminal member in a direction intersecting the arrangement direction and is fixed to the terminal member, and a connection that connects ends of the first portion and the second portion to each other.

The connection includes a plurality of bent portions or curved portions.

With such a configuration, the connection connecting the first portion and the second portion, which extend in respectively different directions, includes the plurality of bent portions or curved portions, so that when stress is generated in the connection, the stress is dispersed. Thereby, it is possible to prevent the plastic strain of the restraint member when a force in a direction from the energy storage devices toward the terminal member is applied to the second portion.

The connection may include two bent portions or curved portions that are convex in a direction away from an area where the energy storage device is disposed, and a bent portion or curved portion that is disposed between the two bent portions or curved portions and is convex in a direction approaching the area.

As described above, the bent portion or the curved portion being convex inward is disposed between the two bent portions or the curved portions being convex outward, that is, the bent portions or the curved portions being convex in the opposite directions are alternately disposed, so that a spring property is generated at the portion. Thereby, when a force in the direction from the energy storage devices toward the terminal member is applied to the second portion, a part of the stress is absorbed at the connection, and as a result, the plastic strain of the restraint member can be prevented effectively.

In this case, the bent portion or the curved portion that is convex in an approaching direction may be disposed at a position closer to the first portion than the second portion in the connection.

As described above, the spring-property generated portion is disposed at the position closer to the first portion in the connection, and hence, when a force in the direction from the energy storage devices toward the terminal member is applied to the second portion, the portion easily stretches in the arrangement direction, so that the stress at the time of application of the force is absorbed more effectively. Thereby, the plastic strain of the restraint member can be prevented more effectively.

In the energy storage apparatus, the connection may include a plurality of portions having different curvatures at different positions between the first portion to the second portion.

With such a configuration, when stress is generated in the connection, the stress is dispersed, whereby it is possible to prevent the plastic strain of the restraint member when a force in the direction from the energy storage devices toward the terminal member is applied to the second portion.

In the energy storage apparatus, the restraint member may include a third portion that is connected to the first portion, the second portion, and the connection and is disposed along the energy storage device.

As described above, the third portion is connected to the first portion, the second portion, and the connection in a state where the first portion and the second portion extending in different directions are connected by the connection, so that the rigidity of the restraint member is improved, whereby the plastic strain of the restraint member can be prevented more reliably.

In the energy storage apparatus, the first portion may be a plate-shaped portion spreading along the energy storage device, and the second portion is a plate-shaped portion spreading along the terminal member.

In the energy storage apparatus, the first portion, the connection, and the second portion may be formed integrally with each other and have a plate shape.

As described above, according to the present embodiment, it is possible to provide the energy storage apparatus capable of preventing the plastic strain of the restraint member.

Hereinafter, an embodiment of the present invention will be described with reference to FIGS. 1 to 4B. Note that the name of each constituent member (each constituent element) in the present embodiment is that in the present embodiment and may differ from the name of each constituent member (each constituent element) in the background art.

Figure 2:
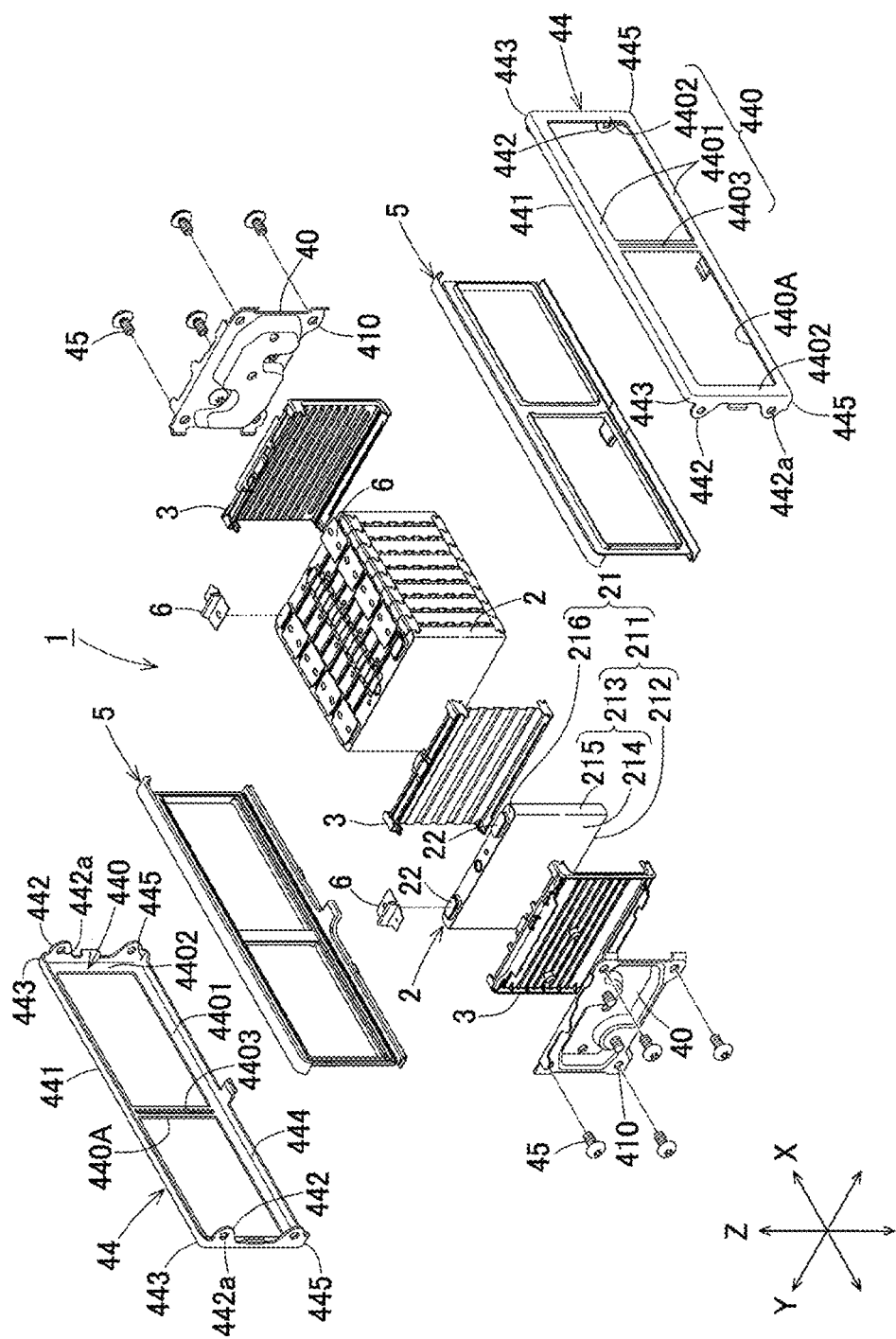
FIG. 2 is an exploded perspective view of the energy storage apparatus in which a part of a configuration is omitted.

As illustrated in FIG. 1 and FIG. 2, an energy storage apparatus includes: an energy storage device 2; and a holding member 4 including a terminal member 40 disposed adjacent to the energy storage device 2 and a restraint member 44 fixed to the terminal member 40. The energy storage apparatus 1 includes: an adjacent member 3 disposed adjacent to the energy storage device 2; an insulator 5 disposed between the energy storage devices 2 and the holding member 4; and a busbar 6 that is connected to different energy storage devices 2 or to external equipment or the like in an electrically connectable manner. The energy storage apparatus 1 of the present embodiment includes a plurality of energy storage devices 2 and a plurality of adjacent members 3, and the holding member 4 collectively holds the plurality of energy storage devices 2 and the plurality of adjacent members 3.

Each of the plurality of energy storage devices 2 is a primary battery, a secondary battery, a capacitor, or the like. The energy storage device 2 of the present embodiment is a nonaqueous electrolyte secondary battery that can be charged and discharged. More specifically, the energy storage device 2 is a lithium ion secondary battery utilizing an electron transfer caused by a transfer of lithium ions. The energy storage device 2 is a so-called prismatic lithium ion secondary battery.

Specifically, each energy storage device 2 includes an electrode assembly, a case 21 that houses the electrode assembly together with an electrolyte solution, and an external terminal 22 at least a part of which is exposed to the outside of the case 21.

The case 21 includes a case body 211 having an opening, and a plate-shaped lid plate 216 that shuts (closes) the opening of the case body 211. The case body 211 of the present embodiment has a bottomed rectangular tube shape, and the case 21 has a flat rectangular parallelepiped shape. The case body 211 includes a rectangular plate-shaped closed portion 212 and a cylindrical barrel portion (peripheral wall) 213 connected to a peripheral edge of the closed portion 212. The barrel portion 213 has a flat prismatic cylindrical shape. The barrel portion 213 includes a pair of long walls 214 extending from the long sides of the peripheral edge of the closed portion 212 and a pair of short walls 215 extending from the short sides of the peripheral edge of the closed portion 212. The short walls 215 connect the corresponding ends of the pair of long walls 214 to each other, thereby forming the flat rectangular cylindrical barrel portion 213. The lid plate 216 is a rectangular plate-shaped member that shuts the opening of the case body 211. A pair of external terminals 22 is disposed on the lid plate 216.

In the energy storage apparatus 1 of the present embodiment, the plurality of energy storage devices 2 are arranged with the long walls 214 of the cases 21 (the case bodies 211) facing each other.

Hereinafter, a direction in which the plurality of energy storage devices 2 are arranged is defined as an X-axis direction of an orthogonal coordinate system, a direction in which the short walls 215 of the case body 211 face each other is defined as a Y-axis direction of the orthogonal coordinate system, and a direction in which the closed portion 212 and the lid plate 216 face each other is defined as a Z-axis direction of the orthogonal coordinate system.

The adjacent member 3 is disposed between two energy storage devices 2 disposed adjacent to each other in the X-axis direction or between the energy storage device 2 disposed at the outermost end in the X-axis direction and a member (in the example of the present embodiment, the terminal member 40 included in the holding member 4) disposed side by side with the energy storage device 2 in the X-axis direction. The adjacent member 3 is made of an insulating material such as resin. Between the adjacent energy storage devices 2, the adjacent member 3 forms a flow path through which a fluid for temperature adjustment of the energy storage devices 2 can flow.

The holding member 4 surrounds the peripheries of the plurality of energy storage devices 2 and the plurality of adjacent members 3 to collectively hold the plurality of energy storage devices 2 and the plurality of adjacent members 3. The holding member 4 is made of a conductive member such as metal. Specifically, the holding member 4 includes a pair of terminal members 40 disposed on both sides in the X-axis direction of the plurality of energy storage devices 2, and a restraint member 44 that connects the ends of the terminal members 40 in the Y-axis direction to each other. The holding member 4 includes a fixing member 45 that fixes (couples) the terminal member 40 and the restraint member 44 to each other. The fixing member 45 of the present embodiment is a bolt. In the energy storage apparatus 1 of the present embodiment, the pair of restraint members 44 connects the ends on both sides in the Y-axis direction of the pair of terminal members 40.

Each of the pair of terminal members 40 is disposed to sandwich the adjacent member 3 between the terminal member and the energy storage device 2 disposed at the end in the X-axis direction. Specifically, each terminal member 40 spreads along a direction of a plane orthogonal to the X-axis direction (a plane including the Y-axis direction and the Z-axis direction: a Y-Z plane). The terminal member 40 has a rectangular shape corresponding to the energy storage device 2 as viewed in the X-axis direction and has holes 410, which penetrate in the X-axis direction, at both ends in the Y-axis direction. The fixing member 45 (in the example of the present embodiment, the bolt) for fixing (coupling) the terminal member 40 and the restraint member 44 is inserted into the hole 410. In the terminal member 40 of the present embodiment, two holes 410 spaced apart from each other in the Z-axis direction are disposed at each of one end and the other end in the Y-axis direction.

On both outer sides of the plurality of energy storage devices 2 arranged in the X-axis direction, the pair of terminal members 40 configured as described above are each disposed to sandwich the adjacent member 3 between the terminal member and the energy storage device 2 (to be more specific, the energy storage device 2 disposed on the outermost side in the X-axis direction) while being in contact with the adjacent member 3.

Figure 3:
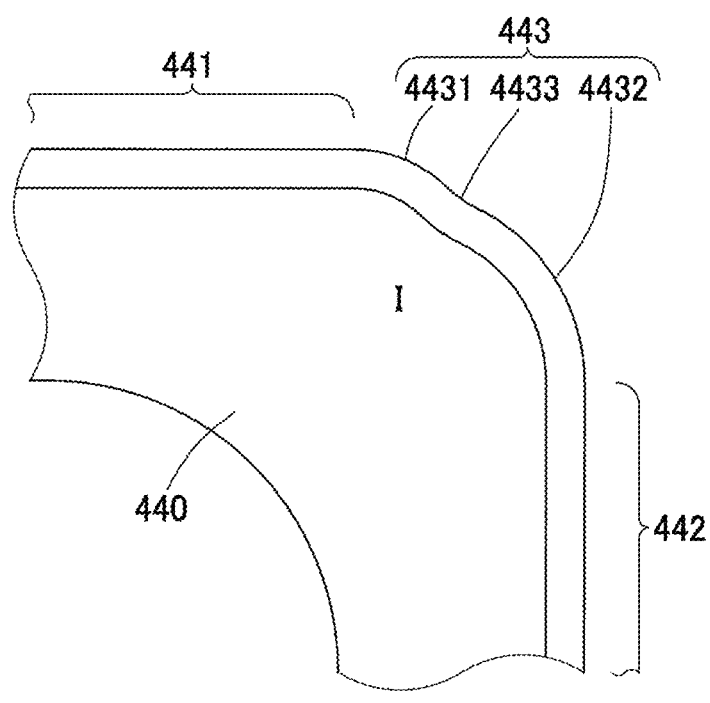
FIG. 3 is a partially enlarged view for explaining a shape of a connection in a restraint member.

The pair of restraint members 44 is disposed on both sides of the plurality of energy storage devices 2 in the Y-axis direction. As also illustrated in FIG. 3, each of the pair of restraint members 44 includes a first portion 441 that extends in the X-axis direction (a direction in which the energy storage devices 2 and the terminal members 40 are arranged) along the energy storage devices 2, a second portion 442 that extends in a direction intersecting the arrangement direction (in the example of the present embodiment, the Y-axis direction) along the terminal member 40 and is fixed to the terminal members 40, and a first connection (connection) 443 that connects the end of the first portion 441 and the end of the second portion 442 to each other. Each of the pair of restraint members 44 includes a restraint member body (third portion) 440 that is connected to the first portion 441, the second portion 442, and the first connection 443 and is disposed along the energy storage devices 2. The details are as follows.

Each restraint member 44 includes: a restraint member body 440 extending in the X-axis direction along each of the plurality of energy storage devices 2 on the outer side of the plurality of energy storage devices 2 in the Y-axis direction; a first portion 441 extending in the Y-axis direction from the restraint member body 440 along the lid plate 216 of each energy storage device 2 and extending in the X-axis direction; a pair of second portions 442 extending in the Y-axis direction from the restraint member body 440 along the outer surface in the X-axis direction of each terminal member 40 and extends in the Z-axis direction; and a first connection 443 connecting the end in the X-axis direction of the first portion 441 and the end in the Z-axis direction of the second portion 442 and extending in the Y-axis direction from the restraint member body 440. Each of the restraint members 44 includes: a fourth portion 444 extending in the Y-axis direction from the restraint member body 440 along the closed portion 212 of each energy storage device 2 and extending in the X-axis direction; and a second connection 445 connecting the end in the X-axis direction of the fourth portion 444 and the end in the Z-axis direction of the second portion 442 and extending in the Y-axis direction from the restraint member body 440.

The restraint member body 440 is a rectangular plate-shaped portion elongated in the X-axis direction spreading along an X-Z plane (a plane including the X-axis direction and the Z-axis direction) and has a plurality of through holes 440A arranged in the X-axis direction. Specifically, the restraint member body 440 includes: a pair of first plate-shaped portions 4401 respectively extending in the X-axis direction along the end on the other side (lid plate 216 side) in the Z-axis direction and the end on one side (closed portion 212 side) in the Z-axis direction of the short wall 215 of each energy storage device 2; a pair of second plate-shaped portions 4402 each extending in the Z-axis direction and connecting the ends of the pair of first plate-shaped portions 4401 to each other; and at least one third plate-shaped portion 4403 disposed between the pair of second plate-shaped portions 4402, extending in the Z-axis direction, and connecting the pair of first plate-shaped portions 4401 to each other.

The first portion 441 is a band plate-shaped portion elongated in the X-axis direction along the X-Y plane. To be more specific, the first portion 441 is a band plate-shaped portion extending in the X-axis direction along the lid plate 216 of each energy storage device 2 and has a constant dimension (width) in the Y-axis direction at each position in the X-axis direction.

Each of the pair of second portions 442 is a portion coupled to the end in the Y-axis direction of the terminal member 40. Specifically, each of the second portions 442 is a plate-shaped portion spreading along the Y-Z plane. Each of the second portions 442 has a hole 442a at a position corresponding to the hole 410 provided at the end in the Y-axis direction of the terminal member 40 (a position overlapping as viewed from the X-axis direction). In the terminal member 40 of the present embodiment, since the two holes 410 disposed at intervals in the Z-axis direction are provided at each end in the Y-axis direction, the two holes 442a spaced apart in the Z-axis direction are also provided in each second portion 442.

The first connection 443 includes a plurality of bent portions or a plurality of curved portions. The first connection 443 of the present embodiment includes a plurality of portions 4431, 4432, 4433 having different curvatures (i.e., at different positions between the first portion 441 and the second portion 442) in a direction from the first portion 441 toward the second portion 442 (cf. FIG. 3). The first connection 443 is sandwiched between the first portion 441 and the second portion 442. That is, in the restraint member body 440, the first portion 441, the first connection 443 and the second portion 442 are continuous (are one body). The first portion 441, the first connection 443, and the second portion 442 have a continuous plate shape.

Specifically, the first connection 443 includes two curved portions (first curved portion 4431, second curved portion 4432) having a curvature that is convex outward, and a third curved portion (reversely curved portion) 4433 disposed between the two curved portions 4431, 4432 and having a curvature that is convex inward. That is, as viewed in the Y-axis direction, the first connection 443 includes the first curved portion 4431 and the second curved portion 4432 that are convex outward with respect to an area I on a side where the energy storage devices 2 are arranged (i.e., in a direction away from the area I), and the third curved portion 4433 that is convex inward with respect to the area I (i.e., in a direction approaching the area I) (are concave outward). The third curved portion 4433 is disposed at a position closer to the first portion 441 than the second portion 442 in the first connection 443. Thereby the length of the first curved portion 4431 in an arc direction is smaller than the length of the second curved portion 4432 in the arc direction. The curvature of the first curved portion 4431 and the curvature of the second curved portion 4432 may be the same or different.

The fourth portion 444 is a band plate-shaped portion elongated in the X-axis direction along the X-Y plane. To be more specific, the fourth portion 444 is a band plate-shaped portion extending in the X-axis direction along the closed portion 212 of each energy storage device 2 and has a constant dimension (width) in the Y-axis direction at each position in the X-axis direction.

The second connection 445 is formed of one curved portion and is sandwiched between the fourth portion 444 and the second portion 442. That is, in the restraint member body 440, the fourth portion 444, the second connection 445 and the second portion 442 are continuous (are one body). The fourth portion 444, the second connection 445, and the second portion 442 have a continuous plate shape.

The insulator 5 has an insulating property and is disposed between the restraint member 44 and the plurality of energy storage devices 2. The insulator 5 covers at least an area of the restraint member 44 facing the plurality of energy storage devices 2. Specifically, the insulator 5 of the present embodiment covers the surface of the restraint member body 440 facing each energy storage device 2 (short wall 215), the surface of the first portion 441 facing each energy storage device 2 (lid plates 216), and the surface of the fourth portion 444 facing each energy storage device 2 (closed portion 212). Thereby, the insulator 5 provides insulation between the restraint member 44 and the plurality of energy storage devices 2.

The busbar 6 is a plate-shaped member made of metal or the like having conductivity. The busbar 6 electrically connects the external terminals 22 of the energy storage devices 2 to each other or electrically connects the external terminal 22 of the energy storage device 2 to external equipment or the like. A plurality of busbars 6 are provided in the energy storage apparatus 1. The plurality of busbars 6 of the present embodiment connect (electrically connect) all the plurality of energy storage devices 2 included in the energy storage apparatus 1 in series.

According to the energy storage apparatus 1 described above, the first connection 443, which connects the ends of the first portion 441 and the end of the second portion 442 extending in different directions, includes the plurality of portions 4431, 4432, 4433 having different curvatures. Thereby, when stress is generated in the first connection 443, the stress is dispersed. That is, since the first connection 443 includes a plurality of portions (portions 4431, 4432, 4433 with different curvatures) where stress concentration is likely to occur, stress is dispersed and stress concentration occurs at a plurality of positions, so that the value of the stress at a portion where the largest stress occurs can be made smaller than the value of the stress at the portion (the portion where stress concentration occurs) in a configuration where stress concentration occurs at one position. As a result, it is possible to prevent the plastic strain of the restraint member 44 when a force in a direction from the energy storage devices 2 or the like toward the terminal member 40 is applied to the second portion 442. That is, according to the energy storage apparatus 1 of the present embodiment, even when a force is applied from the energy storage devices 2 or the like to the second portion 442 of the restraint member 44, and deformation occurs in the restraint member 44 (to be more specific, the first connection 443 and the periphery thereof), the stress is dispersed in the first connection 443, and hence, the stress in the respective portions 4431, 4432, 4433 can be reduced. As a result, the deformation falls within the range of elastic deformation, and hence the plastic strain of the restraint member 44 can be prevented.

Figure 4A:
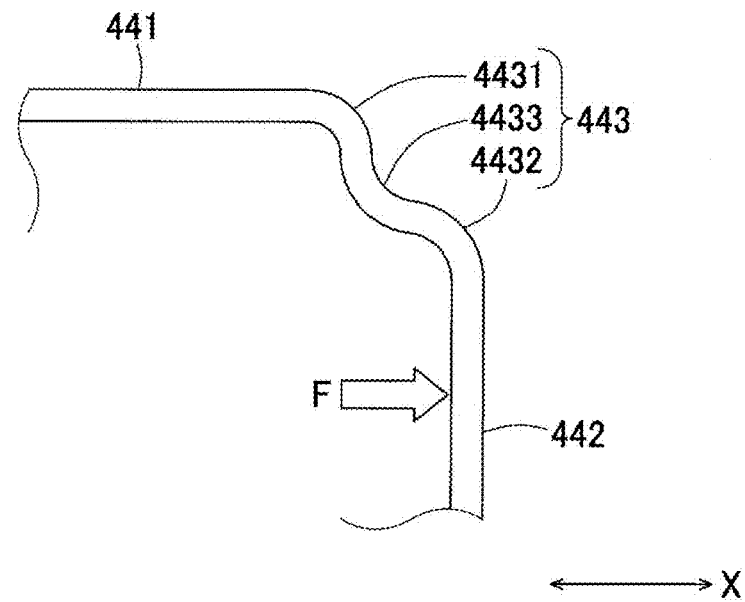
FIG. 4A is a schematic view for explaining a spring property of the connection.
Figure 4B:
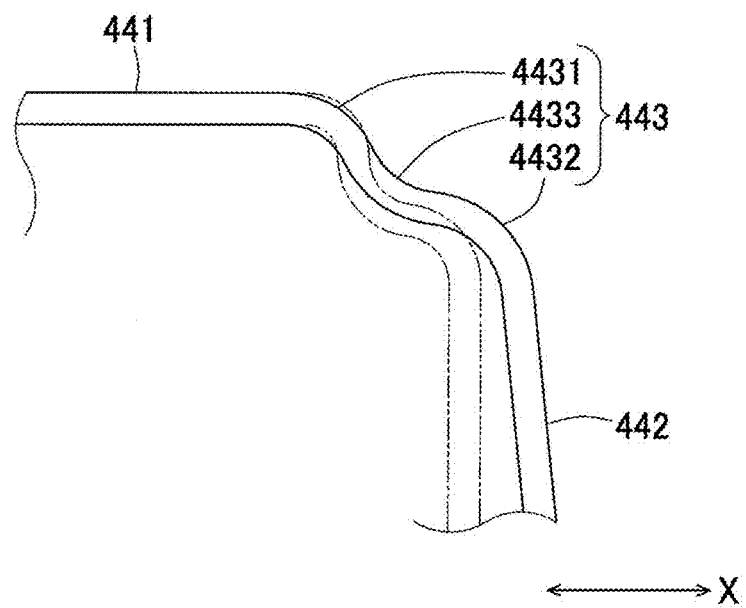
FIG. 4B is a schematic view for explaining the spring property of the connection.

In the energy storage apparatus 1 of the present embodiment, the first connection 443 includes the two curved portions 4431, 4432, and the third curved portion 4433 disposed between the two curved portions 4431, 4432. As described above, the first connection 443 is configured such that the third curved portion 4433 is disposed between the two curved portions (first curved portion 4431, second curved portion 4432), that is, the curved portions having opposite convex directions are alternately disposed, whereby a spring property is generated at the portion (cf. FIGS. 4A and 4B). Thus, when a force F in the direction from the energy storage devices 2 or the like toward the terminal member 40 is applied to the second portion 442, the first connection 443 stretches and absorbs a part of stress. As a result, the plastic strain of the restraint member 44 can be prevented effectively. In FIGS. 4A and 4B, the curve and the stretch are emphasized so as to facilitate the understanding of the stretch due to the spring property.

In the energy storage apparatus 1 of the present embodiment, the third curved portion 4433 is disposed at a position closer to the first portion 441 than the second portion 442 in the first connection 443. That is, the third curved portion 4433 is disposed at a position (offset position) closer to the first portion 441 than an intermediate position between the end of the first portion 441 and the end of the second portion 442 in the first connection 443. As described above, the spring-property generated portion is disposed at the position closer to the first portion 441 in the first connection 443, and hence, when the force F in the direction from the energy storages devices 2 or the like toward the terminal member 40 is applied to the second portion 442, the portion easily stretches in the X-axis direction. Thus, the stress at the time of application of the force F is absorbed more effectively. As a result, the plastic strain of the restraint member 44 can be prevented more effectively.

In the energy storage apparatus 1 of the present embodiment, in the restraint member 44, the plate-shaped restraint member body 440 is connected to the first portion 441, the second portion 442, and the first connection 443 and is disposed along each energy storage device 2. As described above, the plate-shaped restraint member body 440 is connected to the first portion 441, the second portion 442, and the first connection 443 in a state where the first portion 441 and the second portion 442 extending in different directions are connected by the first connection 443, thereby improving the rigidity of the restraint member 44. As a result, the plastic strain of the restraint member 44 can be prevented more reliably.

Example 1

Figure 5:
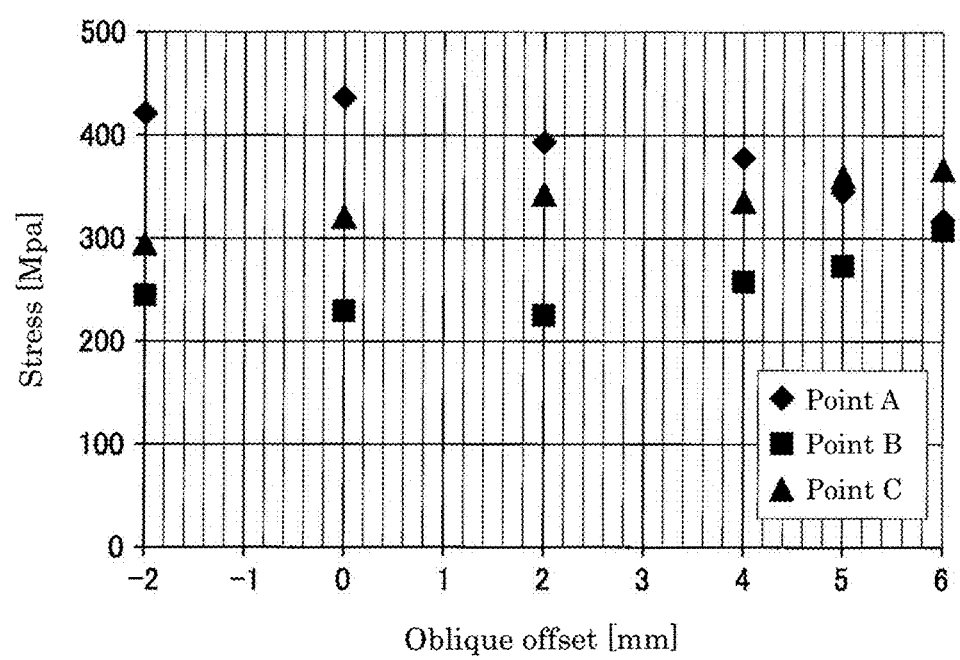
FIG. 5 is a diagram illustrating stress measurement results in an example.
Figure 6:
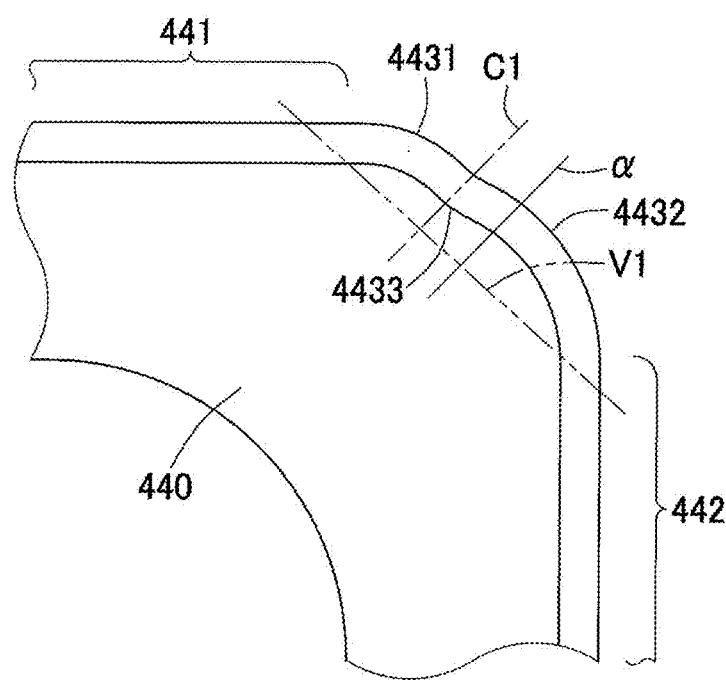
FIG. 6 is a view illustrating a position serving as a reference at the time of changing a position of a reversely curved portion in the example.
Figure 7:
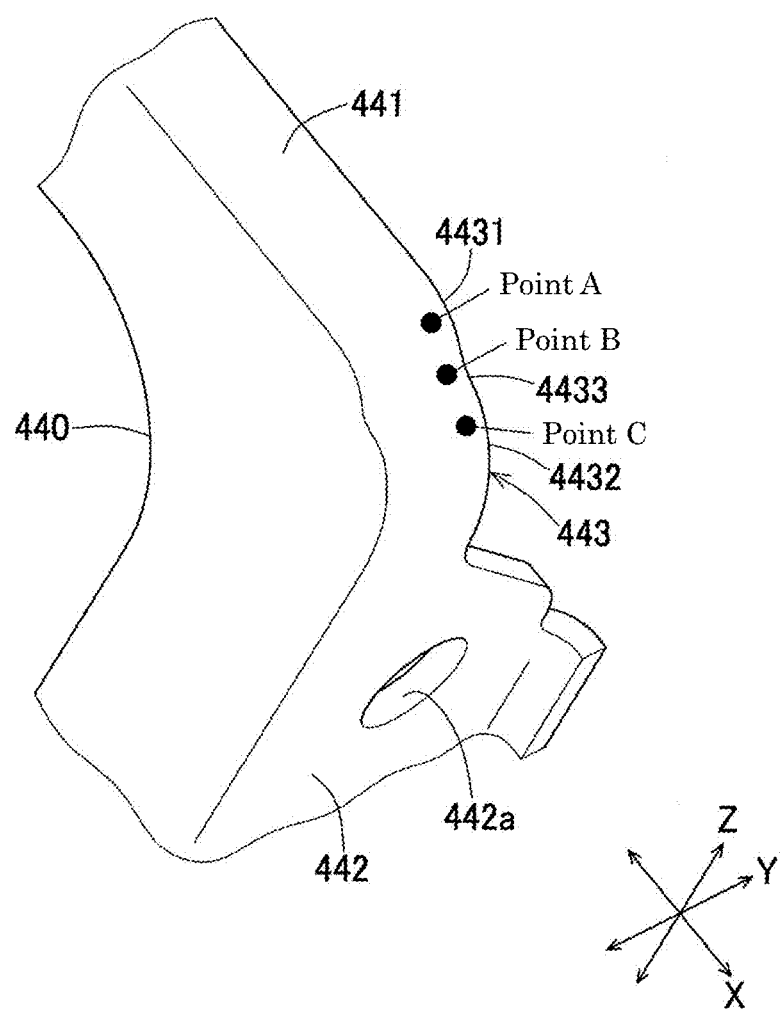
FIG. 7 is a view illustrating positions where stress was measured in the example.

Here, in the first connection 443 of the restraint member 44 of the above embodiment, a simulation was performed in order to confirm the effect by disposing the third curved portion 4433 at the position closer to the first portion 441. FIG. 5 illustrates the results. In this simulation, as illustrated in FIG. 6, an intermediate position between the end of the first portion 441 and the end of the second portion 442 is defined as a reference position α (0 mm), a distance by which a center C1 of the third curved portion 4433 is moved toward the first portion 441 is represented by a plus, and a distance by which the center C1 is moved toward the second portion 442 is represented by a minus. Here, the center C1 of the third curved portion 4433 is moved in a direction parallel to a virtual line V1 connecting the end of the first portion 441 and the end of the second portion 442. When the center C1 of the third curved portion 4433 is at each position in the moving direction, stresses generated at three portions (Point A, Point B, and Point C: see FIG. 7) of the first curved portion 4431, the third curved portion 4433, and the second curved portion 4432 in a state where a force in the X-axis direction is applied to the second portion 442 are obtained.

As can be seen from this result, when the center C1 of the third curved portion 4433 is disposed at a position closer to the first portion 441, the value (the value of generated stress) at the point with the largest stress among the three points A, B, C becomes smaller than when the center C1 of the third curved portion 4433 is disposed at a position closer to the reference position α or the second portion 442. It was thus confirmed that the stress generated in the first connection 443 can be reduced when the third curved portion 4433 is disposed at a position closer to the first portion 441 than the second portion 442 in the first connection 443.

It is natural that the energy storage apparatus of the present invention is not limited to the above embodiment, and various modifications may be made within the scope of the present invention. For example, to the configuration of one embodiment, the configuration of another embodiment can be added, and a part of the configuration of one embodiment can be replaced with the configuration of another embodiment. Further, a part of the configuration of one embodiment can be eliminated.

In the energy storage apparatus 1 of the above embodiment, the third curved portion 4433 is disposed at a position closer to the first portion 441 in the first connection 443, but the present invention is not limited to this configuration. The third curved portion 4433 may be located at the intermediate position (the reference position a in FIG. 6) between the end of the first portion 441 and the end of the second portion 442 in the first connection 443 or a position closer to the second portion 442. Even when the third curved portion 4433 is disposed at any position of the first connection 443, the curved portion 4431 or 4432 and the third curved portion 4433 are disposed side by side to generate a spring property, and hence a part of the stress generated in the first connection 443 is absorbed, whereby the stress generated in the first connection 443 can be reduced.

Figure 8:
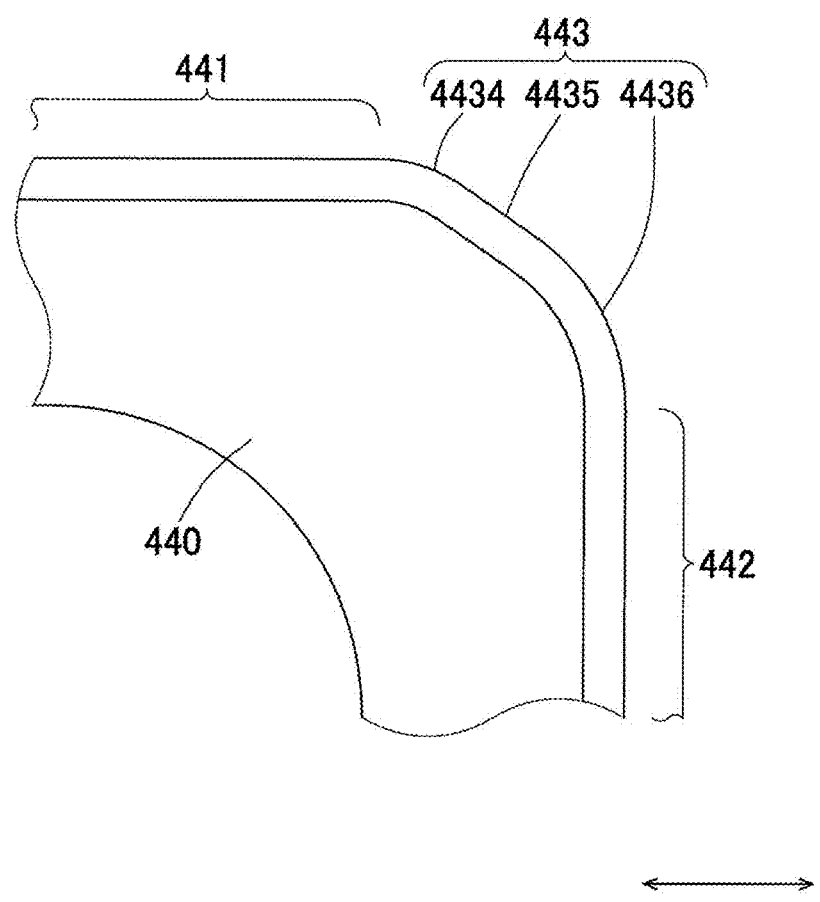
FIG. 8 is a schematic view for explaining a connection according to another embodiment.

Although the first connection 443 of the above embodiment includes the third curved portion 4433, the present invention is not limited to this configuration. For example, as illustrated in FIG. 8, the first connection 443 may not include the third curved portion 4433. That is, when the first connection 443 includes a plurality of portions (e.g., portions indicated by reference numerals 4434, 4435, 4436 in FIG. 8) having different curvatures (including a curvature of 0), the stress generated in the first connection 443 can be dispersed.

In the first connection 443 of the above embodiment, the number of portions 4431, 4432, 4433 having different curvatures (including the third curved portion having a negative curvature) is three, but the present invention is not limited to this configuration. The first connection 443 may have two portions having different curvatures or may have four or more portions having different curvatures. As illustrated in FIG. 8, the portions having different curvatures may include a portion (straight portion) 4435 having a curvature of 0.

Although the first connection 443 of the above embodiment includes the plurality of portions 4431, 4432, 4433 having different curvatures, the present invention is not limited to this configuration. The first connection 443 may include curved portions having the same curvature. That is, the first connection 443 may have a plurality of bent portions or curved portions. The plurality of bent portions or curved portions are continuously or intermittently arranged from the first portion 441 toward the second portion 442 in the first connection 443. Note that the first connection 443 may be configured to include only the bent portion or include only the curved portion or may be configured to include the bent portion and the curved portion in a mixed manner.

The restraint member 44 of the above embodiment includes the restraint member body 440 connected to the first portion 441, the second portion 442, and the first connection 443, but the present invention is not limited to this configuration. The restraint member 44 may be configured without the restraint member body 440, that is, formed of the first portion 441, the second portion 442, and the first connection 443.

In the restraint member 44 of the above embodiment, the first portion 441 has a plate shape extending in the X-axis direction along the lid plate 216 of each energy storage device 2, the second portion 442 has a plate shape extending in the Z-axis direction along the terminal member 40, and the first connection 443 connects the end in the X-axis direction of the first portion 441 and the end in the Z-axis direction of the second portion 442, but the present invention is not limited to this configuration. For example, in the restraint member 44, the first portion 441 may have a plate shape extending in the X-axis direction along the short wall 215 of each energy storage device 2, the second portion 442 may have a plate shape extending in the Y-axis direction along the terminal member 40, and the first connection 443 may connect the end in the X-axis direction of the first portion 441 and the end in the Y-axis direction of the second portion 442. With such a configuration as well, since the first connection 443 includes a plurality of portions with different curvatures, when stress is generated in the first connection 443, the stress is dispersed.

In the restraint member 44 of the above embodiment, the second connection 445 includes one curved portion, but the present invention is not limited to this configuration. The second connection 445 may have the same configuration as the first connection 443. That is, the second connection 445 may include a plurality of bent portions or curved portions. In the restraint member 44, the first connection 443 may include one curved portion, and the second connection 445 may include a plurality of bent portions or curved portions.

In the above embodiment, the case has been described where the energy storage device is used as a nonaqueous electrolyte secondary battery (e.g., lithium ion secondary battery) that can be charged and discharged, but the type and size (capacity) of the energy storage device are arbitrary. In the above embodiment, the lithium ion secondary battery has been described as an example of the energy storage device, but the present invention is not limited thereto. For example, the present invention is also applicable to various secondary batteries, primary batteries, and energy storage devices of capacitors such as electric double layered capacitors.

In order to express the present invention, the present invention has been appropriately and sufficiently described above through the embodiment with reference to the drawings, but it should be recognized that a person skilled in the art can easily modify and/or improve the embodiment described above. Therefore, so long as the modification or improvement implemented by those skilled in the art is not at a level departing from the scope of the claims described in the claims, the modification or improvement is interpreted to be included in the scope of the claims.

DESCRIPTION OF REFERENCE SIGNS

1: energy storage apparatus
2: energy storage device
21: case
211: case body
212: closed portion
213: barrel portion
214: long wall
215: short wall
216: lid plate
22: external terminal
3: adjacent member
4: holding member
40: terminal member
410: hole
44: restraint member
440: restraint member body
4401: first plate-shaped portion
4402: second plate-shaped portion
4403: third plate-shaped portion
440A: through hole
441: first portion
442: second portion
442a: hole
443: first connection (connection)
4431: first curved portion (portion with different curvature)
4432: second curved portion (portion with different curvature)
4433: third curved portion (portion with different curvature)
4434, 4435, 44336: portion with different curvatures
444: fourth portion
445: second connection
45: fixing member
5: insulator
6: busbar
Point A, Point B, Point C: stress measurement position
C1: center of third curved portion
F: force
I: area on side where energy storage device is disposed
V1: virtual line
α: reference position

The invention claimed is:

1. An energy storage apparatus comprising:
an energy storage device;
a terminal member adjacent to the energy storage device; and
a restraint member fixed to the terminal member,
wherein the restraint member includes:
a first portion that extends along the energy storage device in an arrangement direction in which the energy storage device and the terminal member are arranged;
a second portion that extends along the terminal member in a direction intersecting the arrangement direction and is fixed to the terminal member; and
a connection that connects ends of the first portion and the second portion to each other,
wherein the connection includes a plurality of bent portions or curved portions, and
wherein the connection includes a spring-property.

2. The energy storage apparatus according to claim 1, wherein the connection includes:
two bent portions or curved portions that are convex in a direction away from an area where the energy storage device is disposed; and
a bent portion or curved portion that is disposed between the two bent portions or curved portions and is convex in a direction approaching the area.

3. The energy storage apparatus according to claim 2, wherein the bent portion or the curved portion that is convex in an approaching direction is disposed at a position closer to the first portion than the second portion in the connection.

4. The energy storage apparatus according to claim 1, wherein the restraint member includes a third portion that is connected to the first portion, the second portion, and the connection, and is disposed along the energy storage device.

5. The energy storage apparatus according to claim 1, wherein the first portion comprises a plate-shaped portion spreading along the energy storage device, and
wherein the second portion comprises a plate-shaped portion spreading along the terminal member.

6. The energy storage apparatus according to claim 5, wherein the first portion, the connection, and the second portion are formed integrally with each other and have a plate shape.

7. The energy storage apparatus according to claim 2, wherein the two bent portions or curved portions and the bent portion or curved portion are one body.

8. The energy storage apparatus according to claim 1, wherein the connection includes:
   a first curved portion;
   a second curved portion; and
   a third curved portion disposed between the first curved portion and the second curved portion.

9. The energy storage apparatus according to claim 8, wherein the third curved portion has an opposite convex direction to the first curved portion and the second curved portion, whereby the spring property is generated.

10. The energy storage apparatus according to claim 1, wherein the restraint member is connected to the first portion, the second portion, and the connection in a state where the first portion and the second portion extending in different directions are connected by the connection, thereby improving rigidity of the restraint member.

11. The energy storage apparatus according to claim 1, wherein the connection includes a plurality of connections formed as one body.

12. The energy storage apparatus according to claim 1, further comprising an insulator that has an insulating property and is disposed between the restraint member and the energy storage device.

13. An energy storage apparatus comprising:
   an energy storage device;
   a terminal member adjacent to the energy storage device; and
   a restraint member fixed to the terminal member,
   wherein the restraint member includes:
      a first portion that extends along the energy storage device in an arrangement direction in which the energy storage device and the terminal member are arranged;
      a second portion that extends along the terminal member in a direction intersecting the arrangement direction and is fixed to the terminal member; and
      a connection that connects ends of the first portion and the second portion to each other,
   wherein the connection includes a first connection and a second connection,
   wherein the first connection connects an end of the arrangement direction of the first portion and an end of the direction intersecting the arrangement direction of the second portion to each other,
   wherein the first connection includes a plurality of bent portions or curved portions, and
   wherein the first connection includes:
      two bent portions or curved portions that are convex in a direction away from an area where the energy storage device is disposed; and
      a bent portion or curved portion that is disposed between the two bent portions or curved portions and is convex in a direction approaching the area.

14. The energy storage apparatus according to claim 13, wherein the two bent portions or curved portions and the bent portion or curved portion are one body.

15. The energy storage apparatus according to claim 13, wherein the bent portion or the curved portion that is convex in the direction approaching the area is disposed at a position closer to the first portion than the second portion in the connection.

16. The energy storage apparatus according to claim 13, wherein the restraint member is connected to the first portion, the second portion, and the connection in a state where the first portion and the second portion extending in different directions are connected by the connection, thereby improving rigidity of the restraint member.

17. An energy storage apparatus comprising:
   an energy storage device;
   a terminal member adjacent to the energy storage device; and
   a restraint member fixed to the terminal member,
   wherein the restraint member includes:
      a first portion that extends along the energy storage device in an arrangement direction in which the energy storage device and the terminal member are arranged;
      a second portion that extends along the terminal member in a direction intersecting the arrangement direction and is fixed to the terminal member; and
      a connection that connects ends of the first portion and the second portion to each other,
   wherein the connection includes a first connection and a second connection,
   wherein the first connection is disposed between the first portion and the second portion as viewed in the arrangement direction,
   wherein the first connection includes a plurality of bent portions or curved portions, and
   wherein the first connection includes:
      two bent portions or curved portions that are convex in a direction away from an area where the energy storage device is disposed; and
      a bent portion or curved portion that is disposed between the two bent portions or curved portions and is convex in a direction approaching the area.

18. The energy storage apparatus according to claim 17, wherein the two bent portions or curved portions and the bent portion or curved portion are one body.

19. The energy storage apparatus according to claim 17, wherein the bent portion or the curved portion that is convex in the direction approaching the area is disposed at a position closer to the first portion than the second portion in the connection.

20. The energy storage apparatus according to claim 17, wherein the restraint member is connected to the first portion, the second portion, and the connection in a state where the first portion and the second portion extending in different directions are connected by the connection, thereby improving rigidity of the restraint member.

* * * * *